April 30, 1968    W. VELDGEN ETAL    3,380,143
APPARATUS FOR LOADING STUD WELDING GUNS
Filed March 3, 1966    4 Sheets-Sheet 2

INVENTORS
Willy Veldgen
Kurt Clemons
By Walter Becky

United States Patent Office 3,380,143
Patented Apr. 30, 1968

3,380,143
APPARATUS FOR LOADING STUD WELDING GUNS
Willy Veldgen, Gummersbach-Rospe, and Kurt Clemens, Dieringhausen, Germany, assignors to L & C Steinmüller G.m.b.H., Gummersbach, Germany
Filed Mar. 3, 1966, Ser. No. 531,597
Claims priority, application Germany, Mar. 4, 1965, St 23,454
12 Claims. (Cl. 29—212)

The present invention relates to an apparatus for loading stud welding guns. When studding pipes or pipe walls for improvng the heat conductivity thereof, the difficulty is encountered that after a single stud has been welded to the respective pipe by means of the welding gun, the gun has again to be loaded with a new stud. This loading is effected automatically with automatic stud welding machines which have built-in welding guns and which are used for studding straight pipes exclusively. In practice, however, frequently situations are encountered which require the studding of curved or pre-bent pipes or groups of pipes. In addition thereto it also happens that in connection with repairs, straight pipes have to be studded. In such instances, the employment of an automatic welding gun is not possible. Therefore, the studding is still effected manually by means of a welding gun. The individual studs are by means of the welding gun successively applied to the individual pipes. After the welding operation has been completed, the loading of the stud welding gun with a new stud has to be effected manually by an assistant to the welder. Aside from the fact that this type of studding by means of a welding gun is cumbersome and requires considerable time, the requirement of a second operator considerably contributes to the cost.

It is, therefore, an object of the present invention to overcome the above mentioned drawbacks.

It is another object of this invention to provide a loading apparatus which will replace the manual loading of a welding gun as it was heretofore effected by an operator when a manual studding was carried out.

It is still another object of this invention to provide a loading apparatus which will be able to carry out the loading of welding guns at a higher speed than was heretofore possible by a manual loading of such guns.

These and other objects and advantages of the invention will appear more clearly from the following specification in connection with the accompanying drawings, in which.

Figure 5:
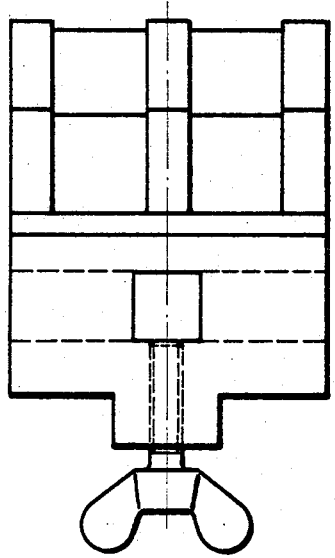
Figure 6:
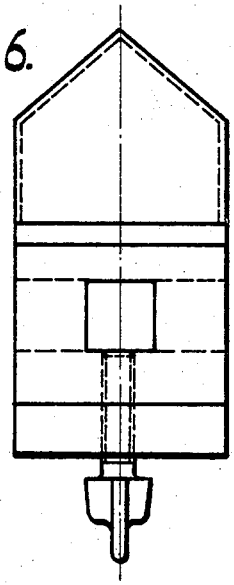
Figure 7:
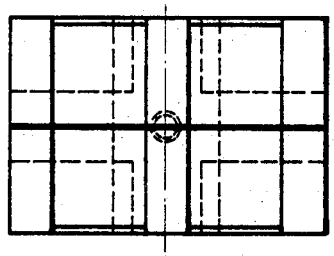

FIGS. 5, 6 and 7 respectively illustrate in side view, end view and top view an electromagnet for use in connection with the present invention.

An apparatus according to the present invention is characterized primarily in that it comprises a housing with built-in elastic transfer sleeve and furthermore comprises a control wedge which is fixedly connected to said transfer sleeve. At one side of the said housing there is provided a receiving plate provided with bores for a stud magazine which comprises a plurality of storage cells and is provided with arresting means. The individual cells of said storage means are adapted by turning the magazine by a certain angle to communicate with a discharge passage through which, after withdrawing a bar, the studs pass to the transfer station in conformity with the cycle of the actuation of the sleeve.

An apparatus comprising the above mentioned features permits a simple and safe loading of the stud welding gun while the loading operation is effected at a considerably higher speed than was heretofore possible by an exclusively manual loading.

In connection with the apparatus according to the present invention, it is particularly advantageous that by a corresponding placement of the loading apparatus for the welding gun in the direct vicinity of the working range of the welder, the attention of the welder is less taxed. The placement of the apparatus according to the present invention in the direct vicinity of the welder may advantageously be effected by means of holding rods rigidly connected to the housing of the device. On these holding rods there are arranged longitudinally displaceable and rotatable permanent magnets by means of which the apparatus can be held on the pipe wall to be studded.

In order to assure that the individual studs follow each other in the storage cells, according to a preferred embodiment of the invention, the bar has that side thereof which faces the discharge passage designed in the form of a trough and is through the intervention of a cam connected to a plane surface portion of the bar. Preferably, the cam of the bar is provided with a cylindrical surface the axis of curvature of which coincides with the axis of rotation of the bar. The design of the cam surface in the form of a cylindrical surface has the advantage that when actuating the bar, the surface portions of the bar and cylinder surface which contact each other will roll on each other whereby the friction is considerably reduced.

According to a further preferred embodiment of the invention, each individual storage cell has associated therewith a so-called individual bar. Each individual bar preferably has its plane surface provided with a spring which has one of its free ends firmly connected to the magazine and due to its thrust assures an engagement of said spring with a control wedge. This control wedge which is fixedly connected to the elastic sleeve is in conformity with a preferred embodiment of the invention provided with an inclined surface over which that portion of the bar which engages the same will slide when the elastic sleeve returns to its starting position, whereby the bar is rotated about its axis of rotation. In view of this rotary movement, the stud engaging the trough is released and rolls through the discharge passage to the transfer station and simultaneously assures through the cam of the bar the rolling of further studs into the discharge passage. Only after the elastic sleeve has been pressed in by placing the welding gun on the respective pipe area, is the rotary movement reversed so that a new stud can roll into the trough of the bar and the next following stud can rest against the stud in the trough-shaped recess.

In order to prevent the studs from dropping out of the storage cells of the magazine, these storage cells may be closed by plate, sleeve, or the like. This closure may be effected advantageously through the intervention of arresting means.

The arrangement of the individual storage cells is expediently so effected that these storage cells are arranged in pairs in a common plane while the feeding passages for the magazine pertaining thereto are arranged as an image to each other. This has the advantage that two storage cells each can at the same time be filled with studs.

The individual cells of the magazine are according to a preferred embodiment of the invention inclined with regard to the horizontal plane by a certain angle so that subsequent rolling of the studs will be assured in the corresponding position of the bar. It is, of course, also possible to assure the following of the studs over an inclined plane by a corresponding spring, in which instance, it will not be necessary to incline the individual storage cells relative to the horizontal plane.

Referring now to the drawing in detail, the apparatus shown therein comprises a housing 1 having arranged therein an elastic transfer sleeve 2 to which a control wedge 3 is fixedly connected. At one side of housing 1 there is provided a receiving dish 4 provided with bores 5 for engagement with arresting members 6 of the stud magazine 7. Studs magazine 7 comprises a plurality of individual storage cells 8 in which the studs are guided while extending in a direction transverse to the longitudinal direction of the cells 8. The individual storage cells 8 may by means of a corresponding rotary movement by a certain angle of magazine 7 be brought into communication with a discharge passage 10 through which after making the bar or blocking member 11 ineffective, the studs 9 will at the rate or rhythm of the actuation of said sleeve 2 pass to the transfer station 12. Mounted on housing 1 are so-called holding bars 13 on which permanent magnets may be arranged which are longitudinally displaceable and are rotatable and preferably have a triangular cross section. These permanent magnets permit suspension of the apparatus according to the invention on the pipe wall to be studded. The preferred triangular cross section of the permanent magnets will assure a safe and proper location of the apparatus according to the invention on the pipe wall to be studded.

Bar or blocking member 11 has that side thereof which faces toward the discharge passage 10 designed in the form of a trough 14 which through the intervention of a cam 15 is connected to a plane surface portion 16 of blocking member 11. Cam 15 has a cylindrical surface 17 which has its axis of curvature A coincide with the axis of rotation A of blocking member 11. Each of the storage cells 8 of magazine 7 has associated therewith a blocking member 11. The plane surface section 16 of blocking member 11 is engaged by a spring 18 which has its free end connected to magazine 7.

Figure 1:
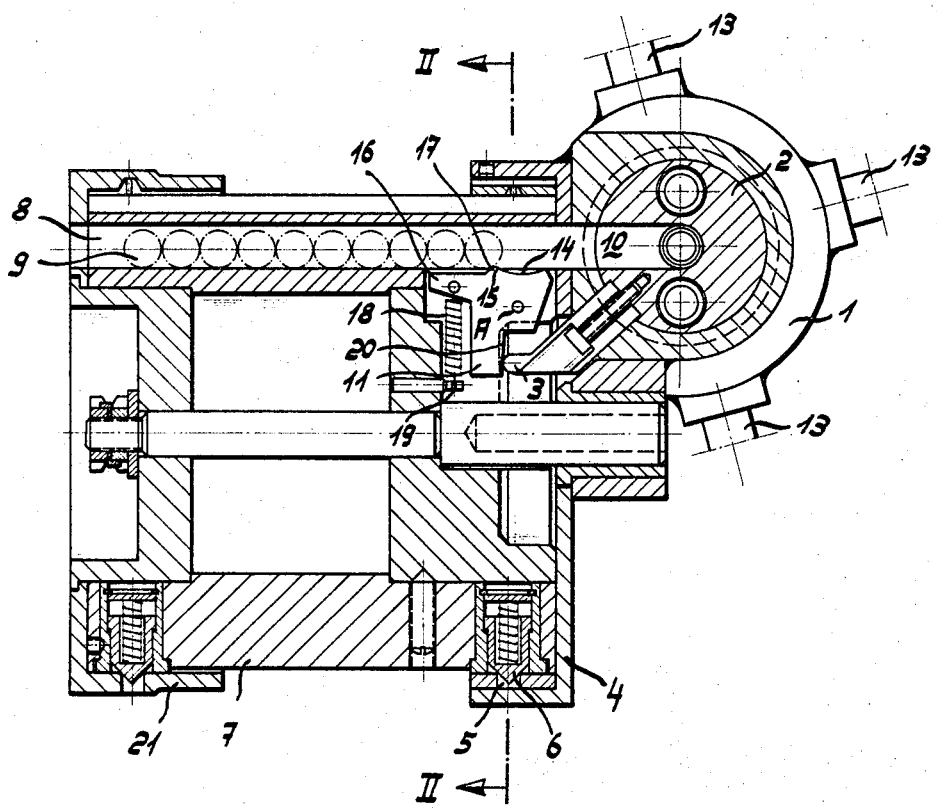
FIG. 1 represents a longitudinal section through a loading apparatus according to the present invention.
Figure 2:
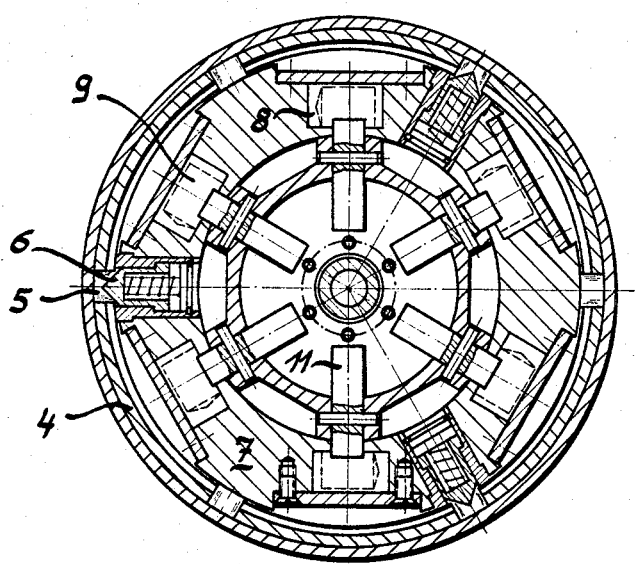
FIG. 2 illustrates a section taken along the line II—II of FIG. 1.
Figure 3:
FIG. 3 is a side view of a control wedge used in connection with the present invention.
Figure 4:
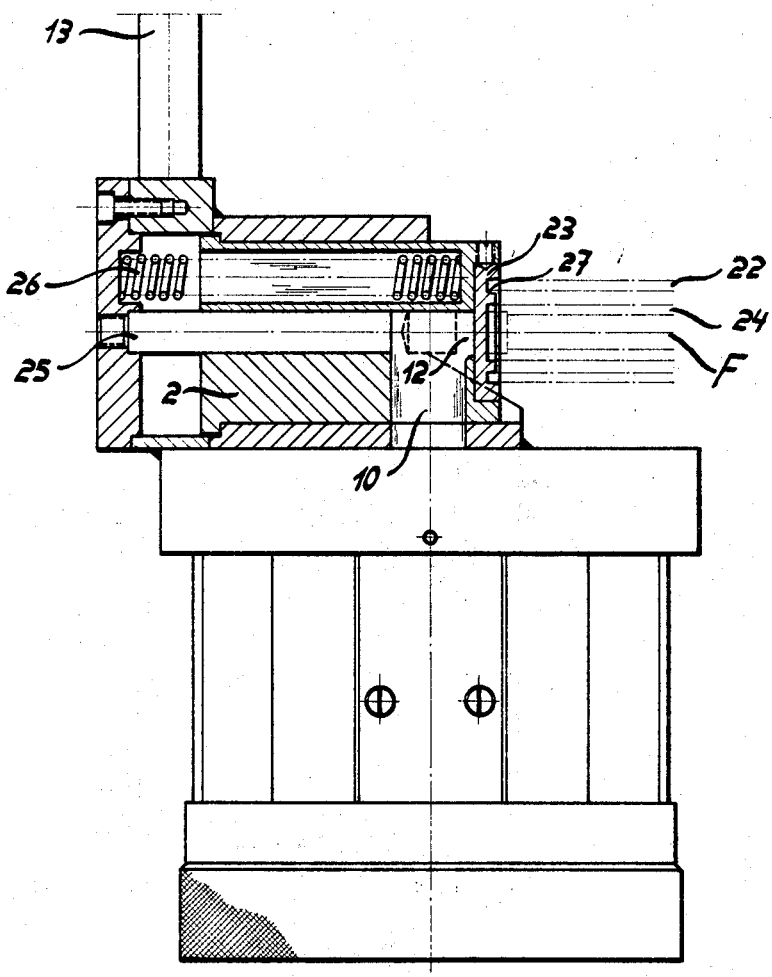
FIG. 4 represents a longitudinal section through the housing of an apparatus according to the present invention with built-in elastic sleeve.

The control wedge member 3 is provided for cooperation with blocking member 11. As will be seen from FIG. 3, control wedge member 3 has an inclined plane over which, when returning the elastic sleeve 2 to its starting position, section 20 of blocking member 11 will slide whereby blocking member 11 will carry out a rotary movement about axis A. The storage cells 8 of stud magazine 7 are closed by means of a closure member 21. The arrangement of the individual storage cells 8 in stud magazine 7 is, in conformity with the present invention, so selected that the storage cells 8 are arranged in pairs and each pair is arranged along a common plane. This way of arranging the storage cells 8 is advantageous with regard to the filling operation. However, in this connection, it is to be taken into consideration that the feeding passages of the respective magazine (not shown) are arranged as images to each other in order to assure that the studs 9 will be properly located in the individual storage cells 8.

In conformity with the present invention, the individual studs 9 in storage cells 8 will due to gravity move into studding position. Therefore, the individual storage cells 8 are in operative condition thereof preferably inclined relative to the horizontal by a certain angle $\alpha$.

The filling of a stud welding gun by means of an apparatus according to the invention is effected in the following manner. When the gun is placed into its working position, the protective sleeve 22 of the gun first rests against a centering ring 23 and is aligned, and when further pressing the gun against the pipe to be studded, the elastic sleeve 24 aligns itself in axial direction of the stud 9 to be received. When further pressing the gun against the pipe to be studded, the elastic sleeve 2 is pressed through in axial direction F so that the conical end of stud 9 will rest on a part 25, whereas the non-conical end is introduced into the mouth of the gun. Inasmuch as the circumferential portion of the mouth piece has longitudinal slots which are parallel to the axial direction, a spring effect is produced which holds stud 9 firmly in the mouth piece of the gun.

As soon as the mouth piece of the gun is filled with a stud 9 and the welding gun is lifted off, the elastic sleeve 2 will due to the thrust of spring 26 move to its starting position whereby through control member 3 fixedly connected to said sleeve, blocking member 11 is moved into a position in which a new stud 9 can pass through discharge passage 10 to the transfer station 12. The next following studs 9 will, however, by cam 15 be prevented from rolling further until the gun is again pressed against the pipe to be studded and control member 3 carries out a return movement effected together with the elastic sleeve 2. In view of this return movement, due to the thrust of spring 18, blocking member 11 is turned into such a position that a new stud 9 can drop into trough 14. The stud 9 now in trough 14 moves out of the latter only when stud 9 at the transfer station 12 is already firmly held in the mouth piece of the gun and by withdrawing the gun and movement of the elastic sleeve 2 to its starting position a new stud 9 is passed through passage 10 to the transfer station 12. It will be appreciated from the above that an apparatus according to the present invention considerably facilitates the studding of pipes and pipe walls.

It is, of course, to be understood that the present invention is, by no means, limited to the particular arrangement shown in the drawings but also comprises any modifications within the scope of the appended claims.

What we claim is:

1. An apparatus for loading stud welding guns, which includes: a housing, transfer sleeve means movable in said housing from a stud-receiving station to a stud transfer station and vice versa, said sleeve means having a receiving channel and a discharge channel communicating with said receiving channel for discharging a stud into a stud welding gun, a magazine rotatably arranged at said housing and having a plurality of stud-receiving passages substantially parallel to the axis of rotation of said magazine and substantially evenly distributed about said axis, said passages being successively movable into a stud-receiving position for receiving studs from a stud supply source and also being successively movable into alignment with said receiving channel in said sleeve means when the latter occupies its stud-receiving station, said sleeve means being operable to transfer a stud received in said stud-receiving channel to said stud discharge channel when occupying a transfer station, and control means associated with said stud-receiving passages and operable in response to the movement of said sleeve means to its stud-receiving station to release one stud at a time to said stud-receiving channel.

2. An apparatus according to claim 1, in which said sleeve means is elastic.

3. An apparatus according to claim 1, which includes holding bars rigidly connected to said housing, and permanent magnet means longitudinally displaceably and rotatably arranged on said holding bars.

4. An apparatus according to claim 1, in which said control means includes locking lever means respectively associated with said stud-receiving passages and having a cam portion for locking engagement with that stud which is closest to said housing, said control means also including actuating means operable by said sleeve means in said stud-receiving station for tilting said lever means to realease the respective adjacent stud.

5. An apparatus according to claim 4, in which each of said lever means respectively associated with the stud-receiving passages has a trough-shaped surface portion between said cam portion and said housing, and spring means continuously urging said locking lever means into engagement with a stud in the respective adjacent stud-receiving passage.

6. An apparatus according to claim 4, in which said cam portion has a cylindrical surface with the axis thereof coinciding with the tilting axis of said locking lever means.

7. An apparatus according to claim 4, which includes spring means for continuously urging said locking lever means into engagement with said actuating means.

8. An apparatus according to claim 4, in which said actuating means has an inclined surface for sliding on said locking lever means in response to the movement of said sleeve means from its stud-receiving to its stud transfer station to thereby tilt said locking lever means.

9. An apparatus according to claim 1, which includes closure means for closing that end of said stud-receiving passages which is remote from said housing.

10. An apparatus according to claim 1, in which said stud-receiving passages are arranged in pairs with the stud-receiving passages of each pair located on opposite sides of the axis of rotation of said magazine and along a common plane.

11. An apparatus according to claim 1, in which said magazine is inclined with regard to a horizontal plane.

12. An apparatus according to claim 1, which includes centering ring means firmly connected to said housing and provided with an annular groove for receiving the screening sleeve of a stud welding gun.

References Cited

UNITED STATES PATENTS

| | | | |
|---|---|---|---|
| 2,278,013 | 3/1942 | Nicholson | 221—105 X |
| 3,034,633 | 5/1962 | Clifford et al. | 198—33 |
| 3,161,274 | 12/1964 | Lanz | 193—43 |
| 3,258,835 | 7/1966 | Boggild et al. | |

THOMAS H. EAGER, *Primary Examiner.*

JOHN F. CAMPBELL, *Examiner.*